(12) United States Patent
Peterson

(10) Patent No.: US 7,325,565 B1
(45) Date of Patent: Feb. 5, 2008

(54) BACKFLOW VALVE

(75) Inventor: Bruce M. Peterson, Alexandria, MN (US)

(73) Assignee: Mizpah LC, Johnston, IA (US)

( * ) Notice: Subject to any disclaimer, the term of this patent is extended or adjusted under 35 U.S.C. 154(b) by 248 days.

(21) Appl. No.: 11/087,306

(22) Filed: Mar. 23, 2005

(51) Int. Cl.
*F16K 31/18* (2006.01)

(52) U.S. Cl. ............... 137/414; 137/428; 251/61.1

(58) Field of Classification Search ........... 137/428, 137/412–414; 251/61.1
See application file for complete search history.

(56) References Cited

U.S. PATENT DOCUMENTS

| | | | | |
|---|---|---|---|---|
| 417,452 A * | 12/1889 | Voltz | .......... | 137/238 |
| 1,799,849 A * | 4/1931 | Hardacker et al. | .......... | 137/411 |
| 1,991,081 A * | 2/1935 | Charpier | .......... | 137/412 |
| 2,549,204 A * | 4/1951 | Kaddatz | .......... | 137/115.02 |
| 3,861,642 A * | 1/1975 | Maddocks | .......... | 251/61.1 |
| 4,006,754 A * | 2/1977 | Houston | .......... | 137/614.21 |
| 4,494,345 A | 1/1985 | Peterson | | |
| 4,783,045 A * | 11/1988 | Tartaglino | .......... | 251/61.1 |
| 4,800,917 A * | 1/1989 | DePirro | .......... | 137/315.08 |
| 4,940,861 A * | 7/1990 | Rizzuto | .......... | 200/84 R |
| 7,118,086 B1 * | 10/2006 | Borglum et al. | .......... | 251/5 |

* cited by examiner

*Primary Examiner*—John Rivell
*Assistant Examiner*—Craig Schneider
(74) *Attorney, Agent, or Firm*—McKee, Voorhees & Sease, P.L.C.

(57) ABSTRACT

The backflow valve of the present invention includes a valve housing having a cavity therein with an inlet and an outlet to the valve cavity. A switch is in communication with the valve cavity and is moveable from an off position to an on position in response to liquid filling the valve cavity. A valve is moveable in response to the movement of the switch to the on position. The valve moves to a closed position shutting off the fluid flow through the backflow valve.

7 Claims, 5 Drawing Sheets

BACKFLOW VALVE

BACKGROUND OF THE INVENTION

The present invention relates to a backflow valve and specifically to a backflow valve that can be used in a home sewer conduit for preventing backflow conditions.

Most homes and businesses include a sewer outlet that leads to a city sewer system. On occasion the sewer outlet will back up, and the sewage will back up into the basement or home of the individual owner. It is desirable to provide a backflow valve that prevents the backflow of sewage into the home.

Therefore a primary object of the present invention is the provision of a backflow valve that will prevent backflow of sewage into a home or office.

A further object of the present invention is the provision of a backflow valve that includes both first, second and third valve members capable of closing off both the entrance and the exit of sewage and bladder seal between entrance and exit flap valves assuring a drop tight seal when a backflow condition occurs.

A further object of the present invention is the provision of a backflow valve that is simple in operation and utilizes a minimum of moving parts.

A further object of the present invention is the provision of a backflow valve that can be easily installed into a conventional sewage system of a home, office or other facility.

A further object of the present invention is the provision of a backflow valve that is economical to use, durable in use, and efficient in operation.

SUMMARY OF THE INVENTION

The foregoing objects may be achieved by a backflow valve for detecting a backflow condition of liquid flowing through a conduit. The backflow valve comprises a valve housing including a valve cavity, an inlet to the valve cavity for receiving the liquid flowing through the conduit and an outlet to the valve cavity for permitting the liquid to exit from the cavity and return to the conduit. A switch is in liquid communication with the valve cavity. The switch is moveable from an off position to an on position in response to liquid filling the valve cavity from a normal liquid level to a backflow liquid level above the normal liquid level. A valve is moveable from an open position permitting liquid flow from the inlet through the valve cavity to the outlet to a close position shutting off liquid flow from the inlet into the valve cavity. A valve actuator is moveable from a first position permitting the valve to be in the open position to a second position moving the valve from the open position to the closed position. The valve actuator is responsive to the switch being in the on position to move the valve from the open to the closed position.

According to another feature of the present invention the valve actuator is a bladder that is inflatable to move from the first to the second position.

According to another feature of the present invention the valve comprises a moveable flap that is moveable in response to inflation of the bladder to move from the open to the closed position.

According to another feature of the present invention the valve comprises both a first flap and a second flap. The first flap is moveable from the open to the closed position to shut off liquid flow from the inlet to the valve cavity. The second flap is moveable from the open to the closed position to shut off liquid flow from the valve cavity to the outlet.

According to another feature of the present invention the first and second flaps are part of a flexible member that is biased towards the open position, but is moveable in response to being engaged by the bladder to the closed position.

According to another feature of the present invention the flexible member is elastic and returns automatically to the open position when the bladder is in the first position.

DETAILED DESCRIPTION OF THE PREFERRED EMBODIMENT

Below is a description of the preferred embodiment of the present invention. This description is of the preferred embodiment, and other embodiments may incorporate the same invention while at the same time producing the same result as the preferred embodiment.

Figure 1:
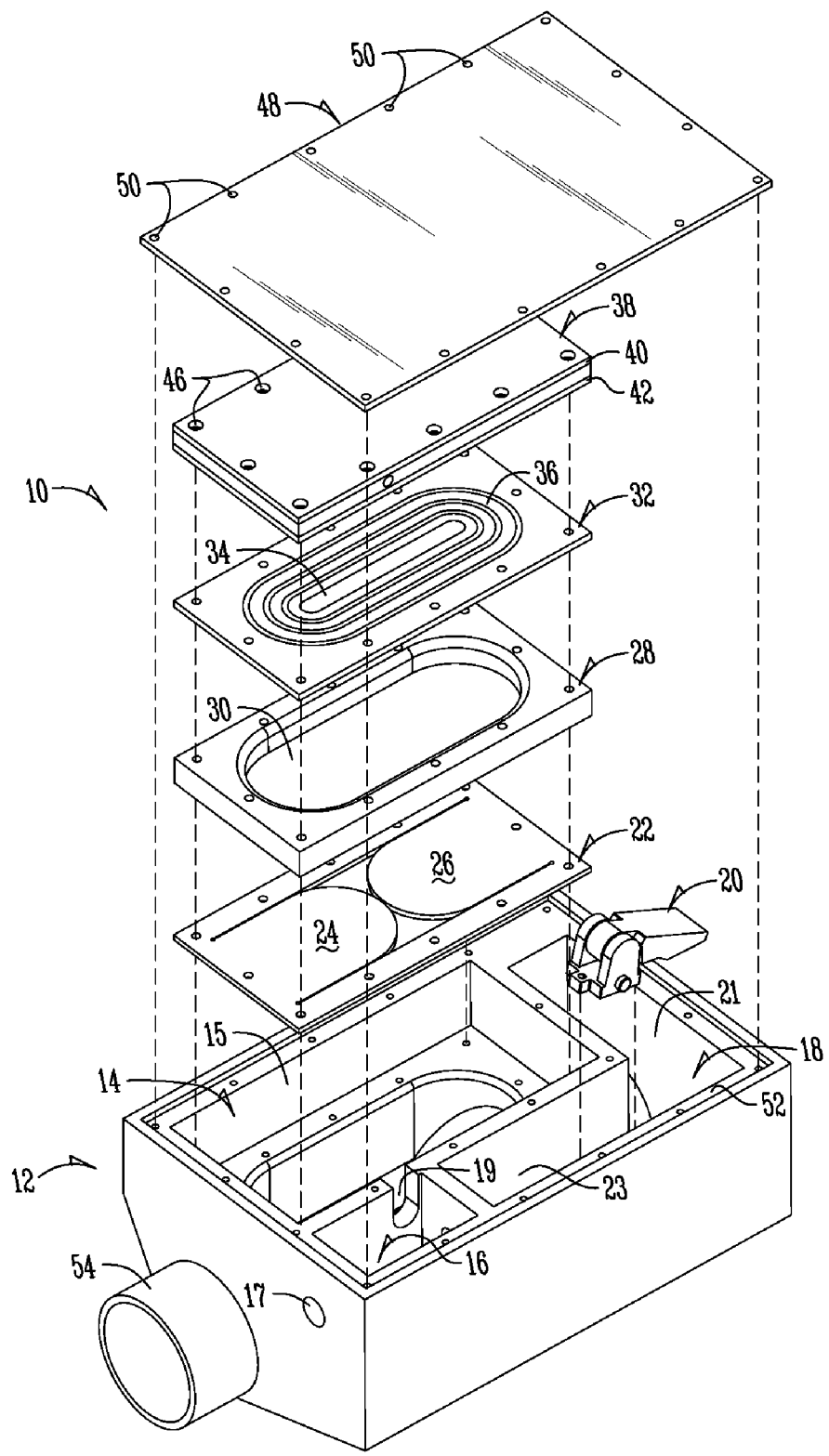
FIG. 1 is an exploded perspective view of a backflow valve of the present invention.
Figure 2:
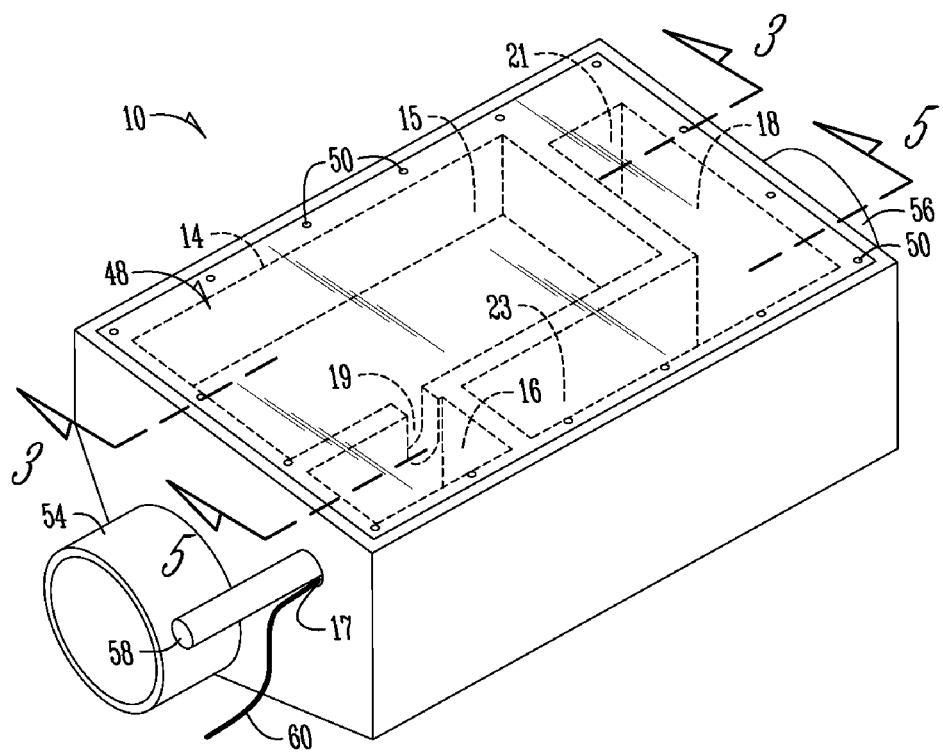
FIG. 2 is a perspective view of the backflow valve with the internal components removed for illustrative purposes.
Figure 5:
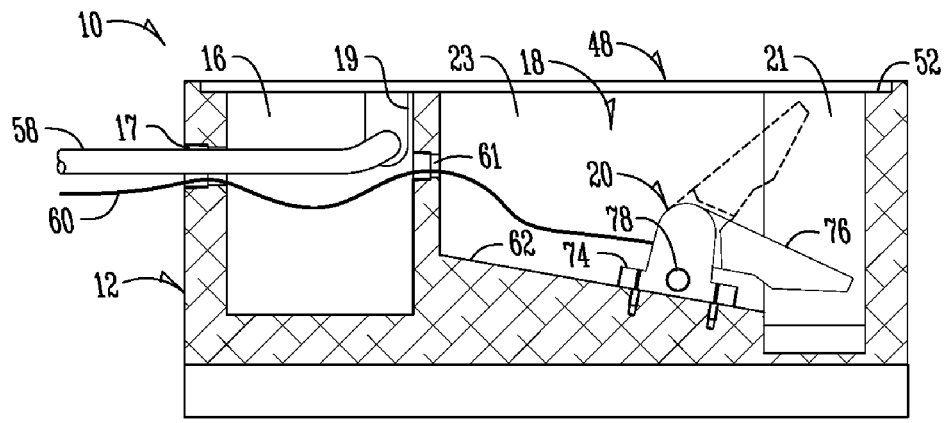
FIG. 5 is a sectional view taken along line 5-5 of FIG. 2 but showing the internal components in place.

Referring to FIG. 1, a backflow valve 10 is shown in an exploded view. Backflow valve 10 includes a valve box 12 which discloses a valve cavity 14. Valve cavity 14 is comprised of a bladder cavity 15 and an L-shaped float cavity 18 which includes a first L portion 21 and a second L portion 23. All the cavities 15, 18, 21 and 23 are in fluid communication with one another. A separate air inlet cavity 16 is separate from and is not in communication with the valve cavity 14, the bladder cavity 15, the L-shaped float cavity 18, the first L portion 21 and the second L portion 23. Extending through the end wall of box 12 is an air tube inlet 17, and extending between the air inlet cavity 16 and the bladder cavity 15 is an air tube notch 19. As can be seen in FIG. 5, an air tube or conduit 58 extends from the exterior of the box 12 through the air tube inlet 17 and the air tube notch 19. Also, an electrical wire 60 extends through air tube inlet 17 and also through a sealed opening 61 into the second L portion 23 of L-shaped float cavity 18.

Within the second L portion 23 is a float switch 20 which is comprised of an anchor 74 and a float 76 that pivots about pivot 78 of anchor 74 (FIG. 5). The float switch 20 is electrically connected to the wire 60. While a float switch may be used, other apparatus for detecting the level of fluid within L portion 23 of L-shaped cavity 18 may be used.

Within bladder cavity 15 is a valve member 22 which includes a first valve flap 24 and a second valve flap 26. The valve member 22 may be comprised of a flexible material such as rubber or the like. The flaps 24, 26 are capable of bending downwardly, but have sufficient resiliency to return to their original position shown in FIG. 1.

Above the valve flap 22 is a bladder collar 28 having an oval shaped opening 30 therein.

Above the bladder collar 28 is a convoluted bladder member 32 which includes a bladder 34 which is oval in shape to conform to opening 30 and which includes accordion folds 36 therein.

Figure 3:
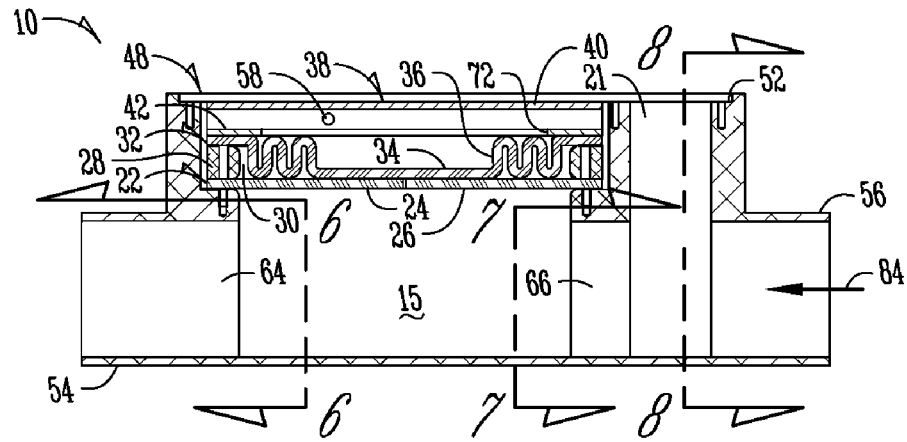
FIG. 3 is a sectional view taken along line 3-3 of FIG. 2 but showing the internal components in place.
Figure 4:
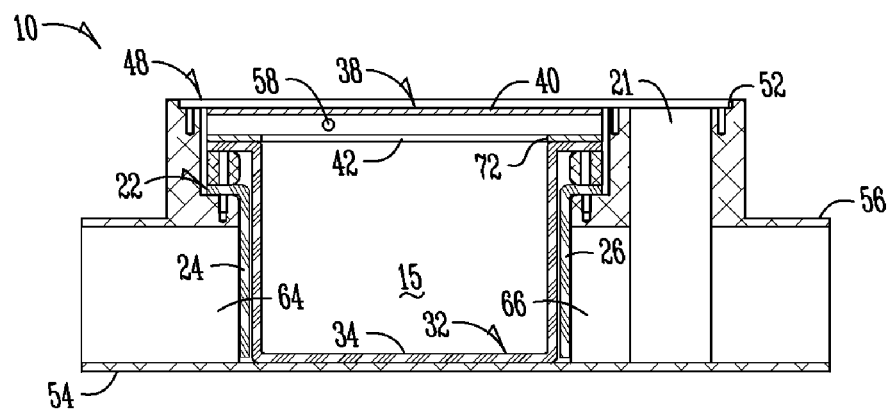
FIG. 4 is a sectional view similar to FIG. 3, but showing the bladder in the inflated condition.

The bladder member 32 is comprised of a flexible material such as rubber or the like and includes sufficient resiliency to permit the bladder 34 to move in response to air pressure from the position shown in FIG. 3 to the expanded position shown in FIG. 4. The bladder member 32 however has sufficient resiliency to return to its original position shown in FIGS. 1 and 3 when air pressure is removed from the upper portion of the bladder 32.

Above the bladder member 32 is a manifold 38 which is comprised of an upper manifold sheet 40 and a lower manifold sheet 42. The air tube 58 extends through air tube notch 19 as shown in FIG. 5 and is in communication between the upper and lower manifold sheets 40, 42 as illustrated schematically by the numeral 58 in FIGS. 3 and 4. The manifold 38, the bladder 32, the bladder collar 28, and the valve member 22 each include a plurality of screw holes 46 around their perimeters for receiving screws that extend into the valve box 12.

A transparent lid 48 having a plurality of screw holes 50 therein is fitted and screwed within a recess 52 in the upper edges of the box 12 so as to create a fluid tight seal over box 12.

A liquid or sewage entrance 56 is in a pipe shape and extends into communication with the valve cavity 14. Similarly a liquid or sewage exit 54 leads from the valve cavity 14 to return the sewage or liquid to the conduit through which it flows. In operation, the liquid entrance 56 is placed in communication with the upstream end of the sewage conduit and the liquid exit 54 is placed in communication with the downstream portion of the sewage conduit.

Referring to FIG. 5, the second L portion 23 includes a sloped floor 62 which slopes to a lower end in communication with the L-shaped portion 21. As can be seen in FIG. 3, the L-shaped portion 21 is in fluid communication with the liquid entrance 56. Similarly, the bladder cavity 15 is in communication with the liquid exit 54.

Figure 6:
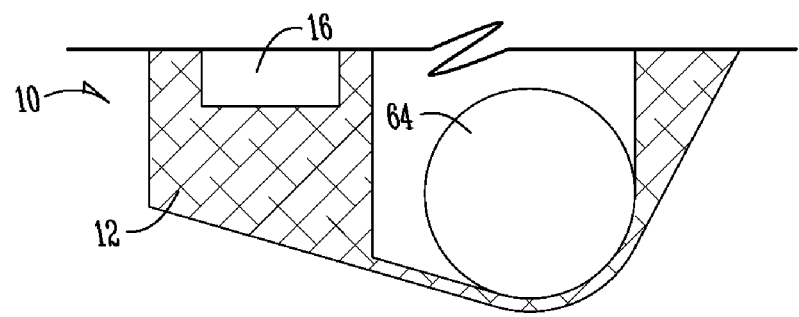
FIG. 6 is a sectional view taken along line 6-6 of FIG. 3.
Figure 7:
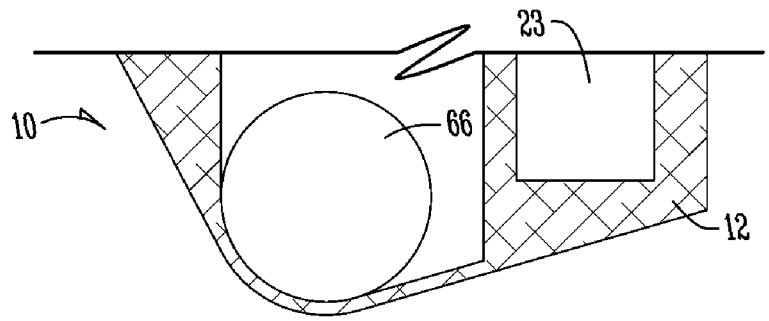
FIG. 7 is a sectional view taken along line 7-7 of FIG. 3.
Figure 8:
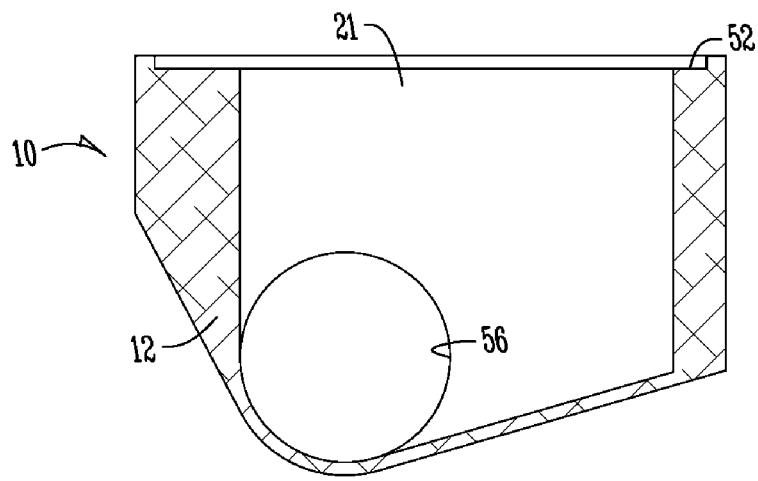
FIG. 8 is a sectional view taken along line 8-8 of FIG. 3.

Referring to FIGS. 6 and 7, an inlet opening 66 provides communication from the inlet opening 66, and an outlet opening 64 is in communication with the liquid exit 54.

FIGS. 3, 4 and 5 show the operation of the backflow valve 10. In normal operation, the sewage or liquid enters entrance 56, then into L-shaped cavity 21, then passes through inlet opening 66 into bladder cavity 15, then passes through outlet opening 64 and then into liquid exit 54. As long as there is no blockage, the valve 10 continues to function in this manner which is shown in FIG. 3. Arrow 84 shows the direction of fluid flow.

Figure 9:
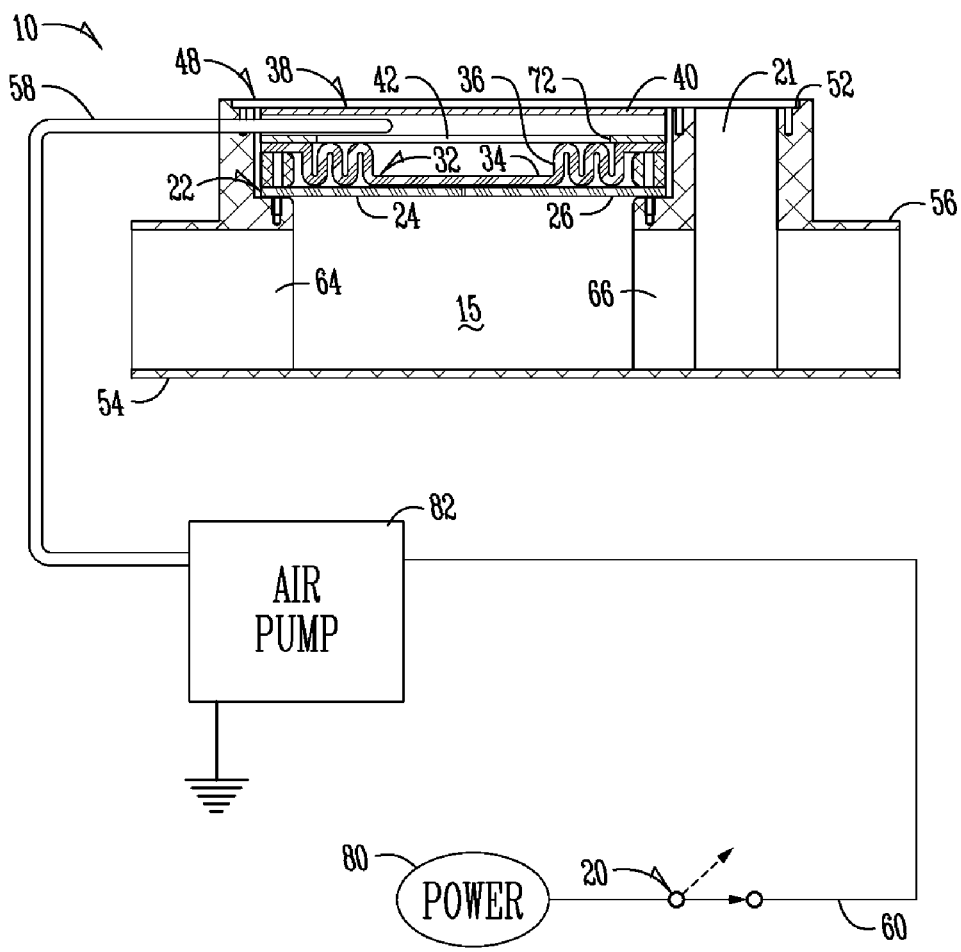
FIG. 9 is a schematic view of the present invention.

However, if a backflow condition occurs or a blockage occurs, FIG. 5 shows the switch 20 which includes the float 76 that moves to the position shown in shadow lines in FIG. 5. This movement is caused by the rise of fluid within L-shaped chamber 18 which includes cavities 21 and 23. This causes the switch 20 to move from its closed position to its open position thereby actuating fluid or air pump 82 shown in FIG. 9. A power source 80 is also shown in FIG. 9. The air pump 82 pumps fluid or air through air tube 58 into the manifold 38. From the manifold 38 the air pressure moves through an air opening 72 against the bladder 32. The bladder 32, because of its accordion folds 36 moves from the position shown in FIG. 3 to the position shown in FIG. 4. In this inflated condition, the bladder 32 engages the first and second valve flaps 24, 26 and urges them to the position shown in FIG. 4 which is in covering sealing relationship over the inlet opening 66 and the outlet opening 64 respectively. In this position, the valve flaps 24, 26 prevent fluid from passing from the entrance 56 outwardly through the exit 54. Thus the backflow valve 10 will remain in a closed condition so long as blockage occurs and a backflow condition is present. However, if for some reason the fluid level lowers in first L portion 21 and second L portion 23, the switch 20 will again move to its closed position and the air will be permitted to exit from bladder 32. This causes the bladder 32 to return to its position shown in FIG. 3. Facilitating of the deflation of bladder 32 may be accomplished by actuating a release valve (not shown) in the air pump 82 or in the conduit 58 to permit the air to escape.

In the drawings and specification there has been set forth a preferred embodiment of the invention, and although specific terms are employed, these are used in a generic and descriptive sense only and not for purposes of limitation. Changes in the form and the proportion of parts as well as in the substitution of equivalents are contemplated as circumstance may suggest or render expedient without departing from the spirit or scope of the invention as further defined in the following claims.

What is claimed is:

1. A backflow valve for detecting a backflow condition comprising:
    a fluid pump;
    a valve housing having a valve inlet, a valve outlet, and a valve cavity in communication with both the valve inlet and the valve outlet;
    an inlet conduit for introducing liquid to the valve inlet;
    an outlet conduit for receiving the liquid from the valve outlet after the liquid passes through the valve cavity;
    a switch within the valve cavity, the switch being movable from an off position to an on position in response to liquid filling the valve cavity from a normal liquid level to a backflow liquid level above the normal liquid level;
    a manifold having an air opening therein;
    a fluid conduit connecting the fluid pump to the manifold for introducing fluid to the manifold and then outwardly through the air opening;
    a bladder located outside the manifold, the air opening, and the fluid conduit, the bladder being movable in response to introduction of fluid pressure from the air opening of the manifold to move from a deflated condition to an inflated condition;
    a first valve member below the bladder and movable from an open position permitting liquid to be introduced from the inlet conduit to the valve cavity and the outlet conduit to a closed position shutting off introduction of fluid from the inlet conduit to the valve cavity and the outlet conduit in response to movement of the bladder from the deflated condition to the inflated condition;
    the fluid pump being electrically connected to the switch and being actuated when the switch is in the on position to cause fluid to be introduced under pressure through the fluid conduit to the manifold and thence through the air opening to inflate the bladder from the deflated condition to the inflated condition.

2. The backflow valve according to claim 1 wherein the manifold includes an upper manifold sheet and a lower manifold sheet spaced apart from one another.

3. The backflow valve according to claim 2 wherein the valve cavity includes a first valve cavity and a second valve cavity in communication with the first valve cavity, the switch being in the second valve cavity, and the manifold, bladder, and first valve member being in the first valve cavity.

4. The backflow valve according to claim 3 wherein the bladder is completely below the manifold and the air opening.

5. The backflow valve according to claim 4 wherein the bladder is folded in accordion fashion when in the deflated condition and fills the first valve cavity when in the inflated condition.

6. A backflow valve for detecting a backflow condition comprising:
   a fluid pump;
   a valve housing having a valve inlet, a valve outlet, and a valve cavity in communication with both the valve inlet and the valve outlet;
   an inlet conduit for introducing liquid to the valve inlet;
   an outlet conduit for receiving the liquid from the valve outlet after the liquid passes through the valve cavity;
   a switch within the valve cavity, the switch being movable from an off position to an on position in response to liquid filling the valve cavity from a normal liquid level to a backflow liquid level above the normal liquid level;
   a manifold having an air opening therein;
   a fluid conduit connecting the fluid pump to the manifold for introducing fluid to the manifold and then outwardly through the air opening;
   a bladder movable in response to introduction of fluid pressure from the air opening of the manifold to move from a deflated condition wherein the bladder is folded in accordion fashion and does not fill the valve cavity to an inflated condition wherein the bladder fills the valve cavity;
   a first valve member below the bladder and movable from an open position permitting liquid to be introduced from the inlet conduit to the valve cavity and the outlet conduit to a closed position shutting off introduction of fluid from the inlet conduit to the valve cavity and the outlet conduit in response to movement of the bladder from the deflated condition to the inflated condition;
   the fluid pump being electrically connected to the switch and being actuated when the switch is in the on position to cause fluid to be introduced under pressure through the fluid conduit to the manifold and thence through the air opening to inflate the bladder from the deflated condition to the inflated condition.

7. A backflow valve for detecting a backflow condition comprising:
   a fluid pump;
   a valve housing having a valve inlet, a valve outlet, and a valve cavity in communication with both the valve inlet and the valve outlet;
   an inlet conduit for introducing liquid to the valve inlet;
   an outlet conduit for receiving the liquid from the valve outlet after the liquid passes through the valve cavity;
   a switch within the valve cavity, the switch being movable from an off position to an on position in response to liquid filling the valve cavity from a normal liquid level to a backflow liquid level above the normal liquid level;
   a manifold having an upper manifold sheet and a lower manifold sheet with an air opening therein;
   a fluid conduit connecting the fluid pump to the manifold for introducing fluid to the manifold and then outwardly through the air opening;
   a bladder movable in response to introduction of fluid pressure from the manifold to move from a deflated condition to an inflated condition;
   a first valve member below the bladder movable from an open position permitting liquid to be introduced from the inlet conduit to the valve cavity to a closed position shutting off introduction of fluid from the inlet conduit to the valve cavity in response to movement of the bladder from the deflated condition to the inflated condition;
   the fluid pump being electrically connected to the switch and being actuated when the switch is in the on position to cause fluid to be introduced under pressure through the fluid conduit to the manifold and thence through the air opening to inflate the bladder from the deflated condition to the inflated condition.

* * * * *